Oct. 20, 1925.
S. L. TERRY
AUTOMOBILE LOCK
Filed Oct. 3, 1921
1,557,899
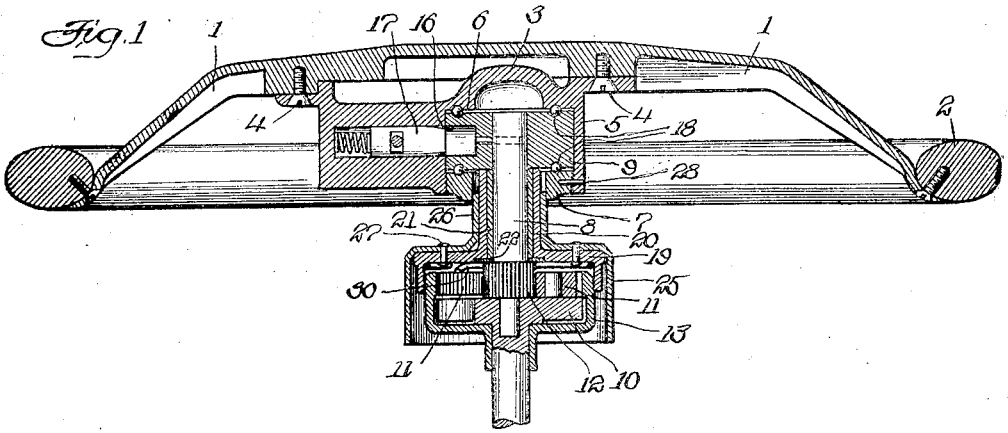
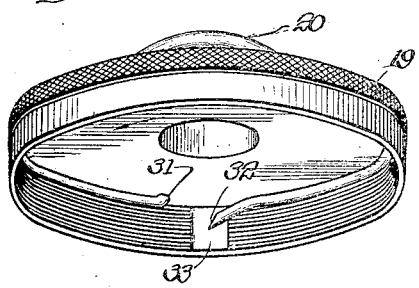
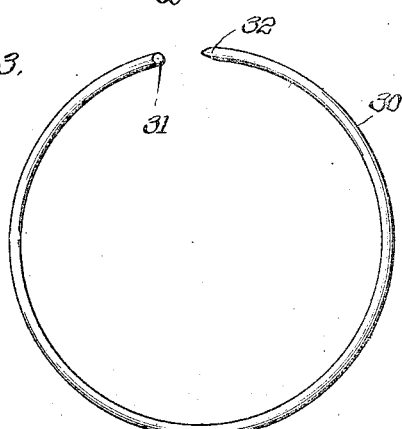
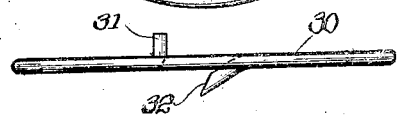
Inventor:
Samuel L. Terry
By Force Bain + Hinkle Attys Patented Oct. 20, 1925.

1,557,899

UNITED STATES PATENT OFFICE.

SEMUEL L. TERRY, OF CHICAGO, ILLINOIS, ASSIGNOR TO TERRY-McCLUSKEY AUTO LOCK CO., A CORPORATION OF ILLINOIS.

AUTOMOBILE LOCK.

Application filed October 3, 1921. Serial No. 505,162.

*To all whom it may concern:*

Be it known that I, SAMUEL L. TERRY, a citizen of the United States, residing at Chicago, in the county of Cook and State of Illinois, have invented certain new and useful Improvements in Automobile Locks, of which the following is a specification.

This invention relates to automobile locks. It will be explained as applied to a lock of the loose steering wheel type although it may be used with locks of other types. In locks of this particular type the steering wheel turns freely or inoperatively when the car is locked. When the car is unlocked the wheel is operatively associated with the guiding wheels.

One of the objects of this invention is to provide an improved automobile lock.

Another object is to provide a lock which may be properly installed with a minimum of labor.

Another object is to lessen the liability of improper installation.

Another object is to increase the theft proof qualities of the lock.

Other objects and advantages will hereinafter appear.

An embodiment of the invention is illustrated in the accompanying drawing, wherein—

Fig. 1 is a vertical axial section through a wheel lock.

Fig. 2 is a perspective of the cap whereby the wheel and lock are secured in position on the steering column.

Fig. 3 is a plan of the locking ring of the cap, and

Fig. 4 is an elevation of the ring.

In some types of automobiles the steering wheel is mounted on a short stud shaft which is carried by the steering column and cooperates with the steering shaft to impart the rotation of the steering wheel to the guiding wheels. For example, in the Ford automobile the steering wheel stud shaft and a small driving pinion thereon, are mounted with the cap of a planetary gear case which is rigidly secured to the steering post column. The pinion on the stud shaft cooperates with other gears in the case to impart the movements of the steering wheel to the guiding wheels. The body or lower section of the gear case and the cap or upper section thereof are complementarily threaded so that they may be screwed together in assembling.

In the improved lock, as applied to a Ford automobile, the steering wheel, locking mechanism, driving pinion and gear case cap are assembled into a unit, which is installed as an entirety in place of the ordinary wheel, pinion and cap. The cap, when screwed upon the body or lower section of the gear case is automatically locked in position so that is can not be removed.

The steering wheel comprises a metal spider having spokes 1 and an outer rim 2 of wood or other suitable material.

The locking mechanism is contained in a hardened-steel burglar proof housing 3 which is secured to spokes 1 by suitable means, such as screws 4. Housing 3 includes a generally cylindrical open bottomed casing 5. The inside wall of casing 5 has an annular shoulder 6 and, at the bottom, is internally threaded to receive an annular hardened-steel holding plate or ring 7.

A stud shaft 8 projects into the chamber of casing 5. The upper end of shaft 8 has an enlarged head 9, in the form of a sleeve, rigidly secured thereto. The head and stud shaft may be secured together by sweating or by a pin, key or other suitable means. Holding ring 7 cooperates with head 9 to hold housing 3 and its wheel to the stud shaft.

The lower end of stud shaft 8 is made to fit the socket in the pinion plate 10 of the ordinary Ford planetary steering gear. Plate 10 carries a number of small pinions 11. Pinions 11 engage a pinion 12, which is preferably made integral with stud shaft 8, and also an internal gear formed in the wall of the usual lower gear case section 13.

The circumferential surface of head 9 is provided with a series of radially extending holes 16 which serve as sockets for a suitable latch-bolt 17. Latch-bolt 17 is contained within housing 3 and is adapted to be inserted into and withdrawn from sockets 16 to lock the wheel to and unlock the wheel from the stud shaft. When the latch-bolt is withdrawn from head 9 the steering wheel is freely and inoperatively rotatable relative to the stud shaft and the car is "locked". When the latch bolt is inserted in one of the sockets of head 9 the rotation of the steering wheel turns the stud shaft and, through the pinion gears in the planetary gear case, controls the guiding wheels of the car. The car is then "unlocked".

The position of the latch-bolt may be controlled by suitable means, such as a key actuated lock-tumbler system of the ordinary type.

To prevent the steering of the car by the warping or skewing and turning of the wheel when the car is locked, ball bearings are provided between the housing and the stud shaft. The upper and lower surfaces of head 9 are provided with annular grooves near the outer edge. Shoulder 6 and plate 7 are provided with similar grooves which, with the grooves in the stud shaft head, form a pair of ball races for balls 18. These ball bearings come into play when the latch-bolt is withdrawn from the stud shaft head and render the operation of the car practically impossible.

The upper section or cap 19 of the planetary gear case is, in general, of the usual construction having an upwardly extending annular collar 20 for encircling the stud shaft and being internally threaded at its lower edge to fit lower section 13. A bushing 21 encircles stud shaft 8 inside of collar 20 and a washer 22 fits between pinion 12 and the inside of the top of cap 19. When applied to the stud shaft, cap 19 is held in position by pinion 12 bushing 21 and head 9. Cap 19 is encircled by a hardened steel burglar proof cup 25 which is made sufficiently long to also cover the lower section of the gear case when in position. Cup 25 has an upstanding collar 26 which fits over and protects the collar of cap 19. Cap 19 and cup 25 may be secured together by suitable means such as rivets 27.

To assemble the unitary structure, ready for installation on a car, washer 22 is first set down upon pinion 12 and bushing 21 is placed about the stud shaft upon the washer. Cap 19 and cup 25 are then placed in position, and plate 7 is set upon them. The socketed head is applied to the upper end of the stud shaft and forced down until the cap, cup, bushing, washer and stud shaft are all tightly fitted together. Then the head is fixed in position. The wheel and balls are then assembled on the head and plate 7 is lifted and screwed tightly into placed where it is held by suitable means such as pins 28.

The steering wheel, locking mechanism, stud shaft, central pinion, gear case cap and gear case protecting cup thus may be assembled as a unit at the factory and may be installed as an entirety. All that is necessary to installation is to remove the old wheel, stud shaft and pinion and the gear case cap. The new unit is then applied by merely screwing the new cap, carrying its wheel, lock, etc., to the lower gear case section.

The cap is automatically secured against removal when it is applied to the lower gear case section. A spring 30 is secured within the cap, in the corner between the top and the side flange thereof. Figs. 2, 3 and 4 show the details and position of this spring. The spring is broken, one end being bent substantially at right angles to provide a lug 31 which fits into a hole in the top of cap 19. This lug may be riveted over on the outside of the cap and firmly anchors the spring. The other end of spring 30 is curved slightly out of the plane of the main body thereof and is given a beveled point 32 which acts like a pawl to engage the lower gear case section 13. The locking action may be increased and made more dependable by cutting away a section of the threads on the inside of the cap to form a small recess 33. The external threads of the lower gear case section also may be notched slightly by a file or saw at the time of installation. There should be enough clearance between the top of the cap and the upper edge of the lower gear case section to prevent the curved free end of the spring from being straightened out by the pressure therebetween.

When the cap, carrying its associated wheel, lock, stud shaft, etc., is screwed to the lower gear case section by rotating the same in the direction of the arrow of Fig. 2 spring 30 offers little or no obstruction to the movement. However, should a reverse movement be attempted the beveled point of the spring bites into the threads of the lower section or abuts against one of the notches formed therein and thus acts like a pawl to prevent the cap from being unscrewed.

No particular skill is required to install this lock. It is simply necessary to screw the cap tightly down upon the lower section. There it is automatically secured in position.

The lock is exceedingly efficient because all of the essential elements thereof are protected by steel burglar proof casings. The ball bearings prevent the creation of sufficient friction to allow steering when the car is "locked." The destruction of the pins which hold the cap and its enclosing cup against relative rotation can do no harm as these pins perform no function after the lock is installed. Their principal function is to allow the outer protecting cup to be used in tightly turning the cap upon the lower gear case section.

Although the lock may be taken apart should occasion require it is a relatively long and difficult operation. It is, in fact, a machine shop undertaking and can not be accomplished by a thief within a time sufficiently short to allow the theft of the car.

Having described my invention what I claim as new and desire to secure by Letters Patent, is:—

1. A device of the character described comprising an interior cup; an exterior cup overlying and closing the interior cup, said cups adapted to be separated by their relative rotation in one direction, an independently rotatable member inside both cups, and a locking member comprising a spring pressed pawl carried by one cup, arranged to bite into the upper edge the other cup when said members are relatively rotated to separate them and thereby to prevent their separation thereafter.

2. A gear casing of the character described, comprising an upper and lower cup complementarily threaded, the upper cup enclosing the lower cup, and a spring pawl locking device secured at one of its ends in the top of the upper cup, the other end sharpened and bent down to bitingly engage the upper edge of the lower cup when screwed into position and to prevent their separation thereafter.

In testimony whereof I hereunto subscribed my name.

SAMUEL L. TERRY.